US011237297B1

(12) United States Patent
Smalley

(10) Patent No.: US 11,237,297 B1
(45) Date of Patent: Feb. 1, 2022

(54) SYSTEMS, METHODS AND APPARATUS FOR REAL-TIME, MULTI-LOCATION WILDFIRE SURVEILLANCE, LOCAL PARAMETER ACQUISITION, DATA TRANSMISSION, AND INTEGRATED SITUATION MONITORING AND ANALYSIS FOR IMPROVED WILDFIRE MANAGEMENT AND SUPPRESSION

(71) Applicant: Olivia Teresa Smalley, Newhall, CA (US)

(72) Inventor: Olivia Teresa Smalley, Newhall, CA (US)

( * ) Notice: Subject to any disclaimer, the term of this patent is extended or adjusted under 35 U.S.C. 154(b) by 673 days.

(21) Appl. No.: 16/057,497

(22) Filed: Aug. 7, 2018

Related U.S. Application Data

(63) Continuation of application No. 14/571,263, filed on Dec. 15, 2014, now Pat. No. 10,042,086.

(60) Provisional application No. 61/916,151, filed on Dec. 14, 2013.

(51) Int. Cl.
| | |
|---|---|
| *G01W 1/02* | (2006.01) |
| *G01K 13/00* | (2021.01) |
| *G01J 5/00* | (2006.01) |
| *G01H 3/00* | (2006.01) |

(52) U.S. Cl.
CPC ............ *G01W 1/02* (2013.01); *G01H 3/00* (2013.01); *G01J 5/00* (2013.01); *G01K 13/00* (2013.01); *G01J 2005/0077* (2013.01)

(58) Field of Classification Search
CPC ... G01H 3/00; G01W 1/02; G01J 5/00; G01K 13/00

USPC .............................................................. 702/2
See application file for complete search history.

(56) References Cited

U.S. PATENT DOCUMENTS

| | | | |
|---|---|---|---|
| 7,114,388 B1 * | 10/2006 | French | G01W 1/00 73/170.16 |
| 7,212,134 B2 * | 5/2007 | Taylor | G08G 1/00 340/539.1 |
| 11,112,512 B2 * | 9/2021 | Meier | G01V 1/008 |
| 2006/0001536 A1 | 1/2006 | Maurer | |
| 2012/0229283 A1 | 9/2012 | McKenna | |
| 2013/0040619 A1 | 2/2013 | Grube | |
| 2013/0268197 A1 | 10/2013 | do Amaral | |
| 2014/0027131 A1 | 1/2014 | Kawiecki | |
| 2014/0099020 A1 | 4/2014 | Ko | |
| 2014/0190248 A1 | 7/2014 | Moran | |
| 2015/0321033 A1 | 11/2015 | Statter | |
| 2016/0112853 A1 | 4/2016 | Goossen | |
| 2016/0112854 A1 | 4/2016 | Goossen | |
| 2017/0007865 A1 | 1/2017 | Dor-El | |

(Continued)

OTHER PUBLICATIONS

Ahmad A. A. Alkhatib; "A Review on Forest Fire Detection Techniques"; International Journal of Distributed Sensor Networks; Mar. 5, 2014; vol. 2014, Article ID 597368; Hindawi Publishing Corporation; Online Publication.

(Continued)

*Primary Examiner* — Aditya S Bhat
(74) *Attorney, Agent, or Firm* — Dennis R. Smalley

(57) ABSTRACT

Embodiments of the Invention provide real-time portable, deployable data acquisition units and monitoring consoles that can be used in combination with radio communication technology to provide for monitoring of wildfires and local weather conditions to aid in fighting wildfires.

20 Claims, 11 Drawing Sheets

(56) References Cited

U.S. PATENT DOCUMENTS

2017/0157441 A1    6/2017    Smith

OTHER PUBLICATIONS

Daxin Zhu & Danlin Cai; "Forest fire monitoring system structure and node design based on wireless sensor network"; School of Computer Science and Technology, Quanzhou Normal University; 2013; Quanzou, P.R. China.

Jaime Lloret, Miguel Garcia, Diana Bri & Sandra Sendra; "A Wireless Sensor Network Deployment for Rural and Forest Fire Detection and Verification"; Sensors Open Access Journal; Oct. 30, 2009; pp. 8722-8747; vol. 2009, Article 9; MDPI; Online Publication.

Luis Bernardo, Rodolfo Oliveira, Ricardo Tiago & Paulo Pinto; "A Fire Monitoring Application for Scattered Wireless Sensor Networks"; 2007; WINSYS; Portugal.

Majid Bahrepour, Nirvana Meratnia & Paul Havinga; "Automatic Fire Detection: A Survey From Wireless Sensor Network Perspective"; Dec. 19, 2008; University of Twente; Enschede, Netherlands.

Mohamed Hefeeda & Majid Bagheri; "Wireless Sensor Networks for Early Detection of Forest Fires"; Mobile Adhoc and Sensor Systems; 2007; IEEE; Pisa, Italy.

Parul Mohindru & Rajdeep Singh; "Multi-Sensor Based Forest Fire Detection System"; International Journal of Soft Computing and Engineering (IJSCE); Mar. 2013; vol. 3, Issue 1; JSCE; Online Publication.

Yanjun Li, Zhi Wang & Yeqiong Song; "Wireless Sensor Network Design For Wildfire Monitoring"; 6th World Congress on Intelligent Control and Automation; 2006; IEEE; Dalian, China.

Young-Guk Ha, Heemin Kim & Yung-Cheol Byun; "Energy-Efficient Fire Monitoring over Cluster-Based Wireless Sensor Networks"; International Journal of Distributed Sensor Networks; 2012; vol. 8, Issue 2; SAGE Online Publication.

Carl Hartung, Richard Han, Carl Seielstad & Saxon Holbrook; "FireWxNet: A Multi-Tiered Portable Wireless System for Monitoring Weather Conditions in Wildland Fire Environments"; MobiSys2006 Conference; 2006; Uppsala, Sweden.

* cited by examiner

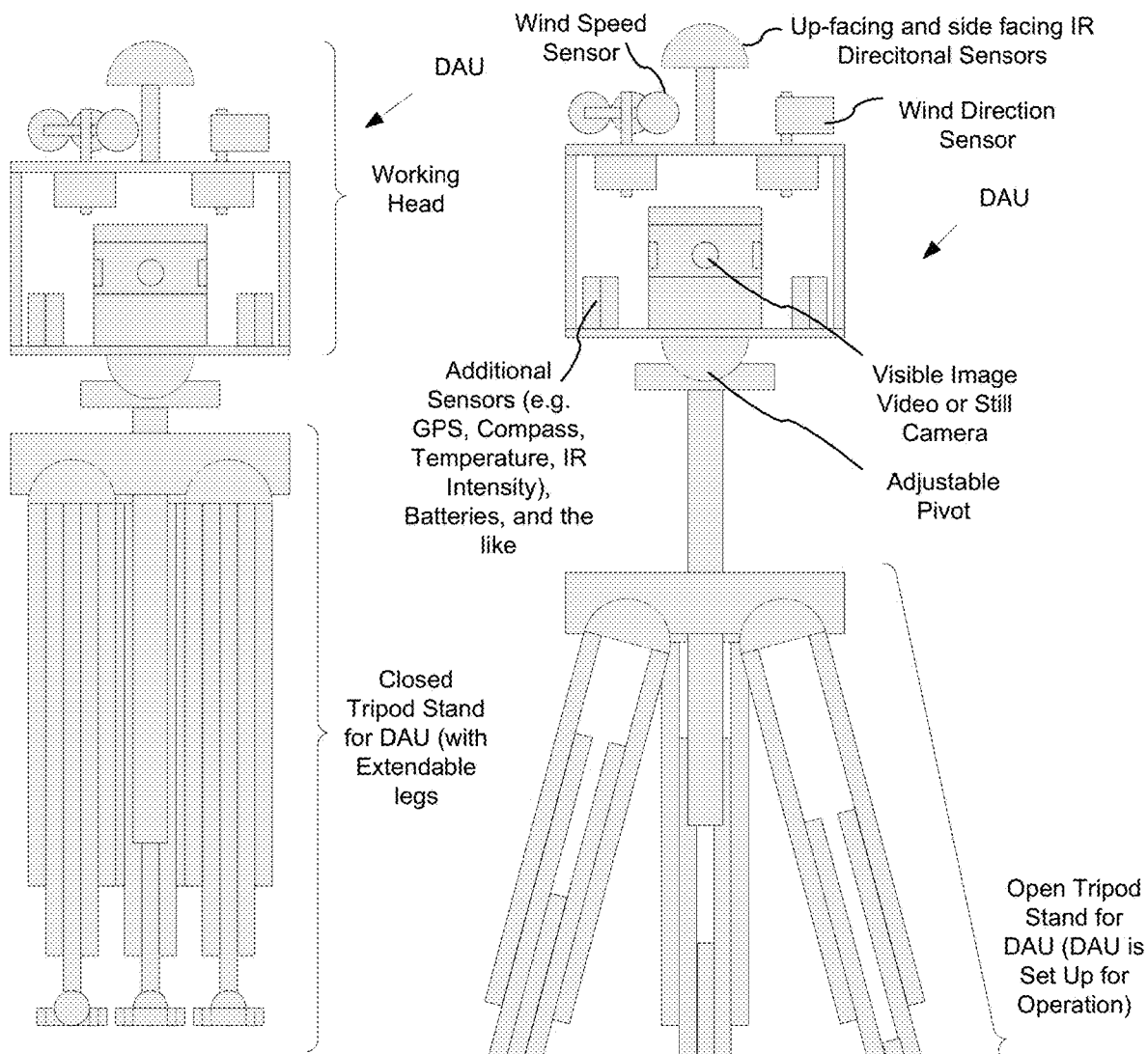
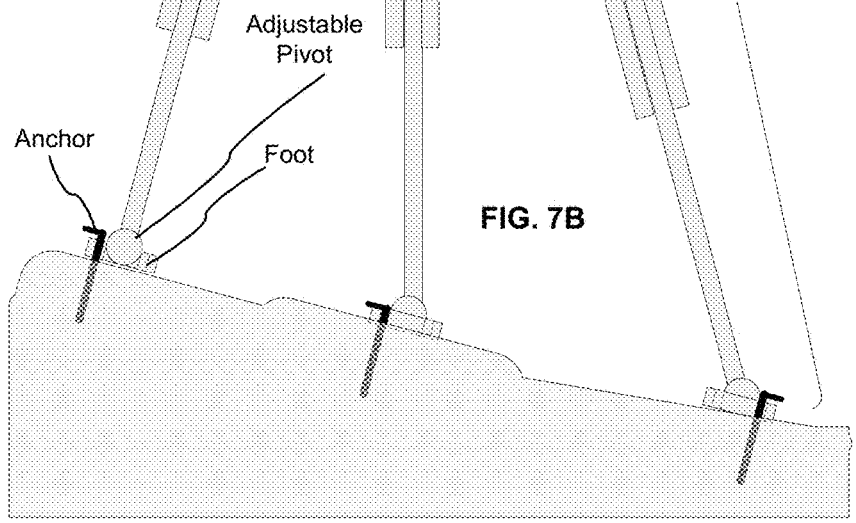
FIG. 7A
FIG. 7B

SYSTEMS, METHODS AND APPARATUS FOR REAL-TIME, MULTI-LOCATION WILDFIRE SURVEILLANCE, LOCAL PARAMETER ACQUISITION, DATA TRANSMISSION, AND INTEGRATED SITUATION MONITORING AND ANALYSIS FOR IMPROVED WILDFIRE MANAGEMENT AND SUPPRESSION

RELATED APPLICATIONS

The present application is a continuation of U.S. patent application Ser. No. 14/571,263, filed Dec. 15, 2014, now U.S. Pat. No. 10,042,086, which claims benefit of U.S. Provisional Patent Application No. 61/916,151 filed Dec. 14, 2013.

FIELD OF THE INVENTION

This invention relates to the field of firefighting and more particularly to the field of fighting wildfires and even more particularly to the field of information acquisition and situation monitoring for improved management of wildfires.

BACKGROUND OF THE INVENTION

Wildfires occur all the time all over the world. They have a significant presence in the US Southwest and are growing more intense as overgrowth has increased and as climate changes lead to drier conditions. They can have both destructive and regenerative effects. Occasional fires can prevent larger more destructive fires by limiting fuel sources, but wildfire suppression remains a common goal particularly in urban-wildland interface areas where immediate property damage and public safety issues dominate. When the goal is to suppress or eliminate a wildfire, manpower mobilization, cost, and rapid resource availability can be critical and controlling issues.

A need exists for reducing wildfire fighting costs, reducing risks involved in fighting the fires, and reducing damage caused by such fires. Put another way, a need to gain more rapid control and containment of wildfires exists.

SUMMARY OF THE INVENTION

It is believed that costs, risks, damage reduction, and/or more rapid containment of wildfires can be achieved, at least in part, by utilization of improved methods and systems for monitoring wildfire movements.

It is an object of some embodiments of the invention to provide a cost reduction in fighting wildfires.

It is an object of some embodiments of the invention to provide a reduction in damage that could otherwise occur from wildfires and especially from wildfires in wildland and urban interface regions.

It is an object of some embodiments to provide for more rapid containment of wildfires.

It is an object of some embodiments to reduce risk to firefighters while fighting fires whether in a wildland setting, a wildland/urban interface setting, or in fighting building fires that have originated from outside the buildings.

It is an object of some embodiments to provide improved methods for fighting wildfires by providing enhanced and/or more timely data to firefighters and fire analysts.

It is an object of some embodiments to provide improved apparatus and/or systems for fighting wildfires by collecting and presenting enhanced and/or more timely data to firefighters and fire analysts.

Other objects and advantages of various embodiments and aspects of the invention will be apparent to those of skill in the art upon review of the teachings herein. The various aspects of the invention, set forth explicitly herein or otherwise ascertained from the teachings herein, may address any one of the above objects alone or in combination, or alternatively may address some other object of the invention ascertained from the teachings herein. It is not intended that any specific aspect of the invention (that is explicitly set forth below or that is ascertained from the teachings herein) necessarily address any of the objects set forth above let alone address all of these objects simultaneously; however some aspects may address one or more of these objects or even all of these objects simultaneously. It is not intended that all aspects of the invention be simultaneously met by any specific implementation or use of the invention but that each aspect, whether explicitly set forth or ascertained from the teachings herein as a whole, independently represent such an implementation or use (e.g. method of making, method of use, apparatus, or system) of a variation of the invention.

In a first aspect of the invention a portable, unmanned, real-time, remote, wildfire parameter data acquisition unit (DAU), includes: (a) a working head comprising a housing, a plurality of sensors, and control and communications electronics; (b) a power source connected to the control and communication electronics; (c) a stand including at least one leg which can be used to locate the working head off the ground with a desired orientation and height; wherein the plurality of sensors consist of at least three transducers selected from the group consisting of (1) at least one wind speed to electrical signal transducer, (2) at least one wind direction to electrical signal transducer, (3) at least one humidity to electrical signal transducer, (4) at least one air temperature to electrical signal transducer, (5) at least one surface temperature to electrical signal transducer, (6) at least one gravity direction to electrical signal transducer, (7) at least one compass direction to electrical signal transducer, (8) at least one GPS location to electrical signal transducer, (9) at least one GPS orientation to electrical signal transducer, (10) at least one level to electrical signal transducer, (12) at least one barometric pressure to electrical signal transducer, (13) at least one visible imaging to electrical signal transducer, (14) at least one IR imaging to electrical signal transducer, (15) a plurality of differently oriented non-imaging IR to electrical signal transducers, (16) at least one electrical signal to radio wave transducer, (17) at least one radio wave to electrical signal transducer, (18) at least one sound transducer, (19) at least one user input to electrical transducer, (20) at least one electrical signal to user understandable output signal (e.g. readable display signal, light signal, sound signal, tactile signal, and the like); and (21) a power source power level sensor; and wherein the control and communication electronics comprise circuitry to provide at least three functions selected from the group consisting of (1) sending radio signals carrying data derived from the at least three sensors, (2) receiving radio signals and modifying a behavior of the DAU according to received signals; (3) analyzing data obtained from at least one sensor to yield trend information from that sensor, (4) analyzing data obtained from at least one sensor and modifying the types, powers, or even electromagnetic transmit frequencies of radio signals being sent out, and (5) analyzing data obtained from at least one sensor and modifying the time frequency of radio signals being sent out.

Numerous variations of the first aspect of the invention exist and may include for example those elements noted in the claims that depend from claim 1 as set forth in the filing of this application. Other variations are possible and may, for example, combine the variations of the first aspect with one another.

A second aspect of the invention provides a portable, unmanned, real-time wildfire remote fire parameter data acquisition unit (DAU), including: (a) a working head comprising a housing, and a plurality of sensors; (b) control and communication electronics; (c) a power source connected to the sensors and control and communication electronics; wherein the plurality of sensors consist of at least three transducers selected from the group consisting of (1) at least one wind speed to electrical signal transducer, (2) at least one wind direction to electrical signal transducer, (3) at least one humidity to electrical signal transducer, (4) at least one air temperature to electrical signal transducer, (5) at least one surface temperature to electrical signal transducer, (6) at least one gravity direction to electrical signal transducer, (7) at least one compass direction to electrical signal transducer, (8) at least one GPS location to electrical signal transducer, (9) at least one GPS orientation to electrical signal transducer, (10) at least one level to electrical signal transducer, (12) at least one barometric pressure to electrical signal transducer, (13) at least one visible imaging to electrical signal transducer, (14) at least one IR imaging to electrical signal transducer, (15) a plurality of differently oriented non-imaging IR to electrical signal transducers, (16) at least one electrical signal to radio wave transducer, (17) at least one radio wave to electrical signal transducer, (18) at least one sound transducer, (19) at least one user input to electrical transducer, (20) at least one electrical signal to user understandable output signal (e.g. readable display signal, light signal, sound signal, tactile signal, and the like); and (21) a power source power level sensor; and wherein the control and communication electronics comprise circuitry to provide at least three functions selected from the group consisting of (1) sending radio signals carrying data derived from the at least three sensors, (2) receiving radio signals and modifying a behavior of the DAU according to received signals; (3) analyzing data obtained from at least one sensor to yield trend information from that sensor, (4) analyzing data obtained from at least one sensor and modifying the types of radio signals being sent out, and (5) analyzing data obtained from at least one sensor and modifying the frequency of radio signals being sent out.

A third aspect of the invention provides a system for monitoring wildfires, including: (a) at least one real-time portable wildfire data acquisition unit (DAU); (b) at least one command and control console (CCC) which provides a primary interface with a system user; and wherein information gathered by the at least one DAU is displayed on the CCC to provide a user with useful near-real time information.

Numerous variations of the second aspect of the invention exist and may include for example those variations as noted for the first aspect.

A fourth aspect of the invention provides a method for monitoring wildfires, including: (a) deploying and activating a plurality of DAUs, (b) obtaining near-real time data from the DAUs at at least one command and control console, (c) monitoring the displayed data, (d) making firefighting decisions, based at least in part, on the displayed data.

A fifth aspect of the invention provides a wildfire command and control console capable of receiving data from a plurality of DAUs, capable of presenting the data in a graphical format on a display overlaid on a map showing the positions of the DAUs.

Additional aspects of the invention provide DAUs, systems and methods, similar to those noted in the first through fifth aspects with the exception that the DAUs, the systems, and/or the methods are used to monitor critical situations other than wildfires, such a flood control basins, potential slide, or mud flow regions during rains in regions that have been subject to wildfires.

Further variations of the aspects of the invention are possible. For example, a variation set forth in association with one aspect of the invention may act as a variation of another aspect of the invention or even a variation of a variation of another aspect of the invention so long as the added variation does not completely eliminate the function of the original aspect, the original variation of the aspect, or variations of the aspect. Further aspects of the invention will be understood by those of skill in the art upon reviewing the teachings herein. These other aspects of the invention may provide various combinations of the aspects presented above as well as provide other configurations, structures, functional relationships, processes, alternative ordering of steps from the example processes set forth herein and uses that have not been specifically set forth above.

BRIEF DESCRIPTION OF THE DRAWINGS

FIGS. 7A and 7B depict collapsed and expanded versions of a DAU that uses a tripod stand.

DETAILED DESCRIPTION OF PREFERRED EMBODIMENTS OF THE INVENTION

Figure 1:
FIG. 1 provides an example of what a fire behavior analyst might see on a CCC when a fire in the Santa Clarita valley area of California is surrounded by several dozen DAU devices.

Embodiments provide improved systems and methods for gathering information during a wildfire or other short term event (e.g. days to weeks to months), typically from multiple (2 or more, 10 or more or even 100 or more) Real-Time unmanned Surveillance and Data Acquisition sensor arrays Units (RTSDAUs) or more simply Data Acquisition Units (DAUs) deployed at strategic locations around a fire (e.g. on ridges, in valleys or canyons, around escape routes, around structures, and the like) or other situations (e.g. post wildfire slide or mudflow regions) that could benefit from monitoring. Such apparatus may include one or more working heads that may include various sensors, actuators, a housing, shields, water jackets, batteries, battery charging systems (solar, wind, thermal electric generators, or the like), one or more fixed, adjustable, or even actuatable legs for positioning and orienting the working heads (e.g. 5-8 feet, or more, off the ground with, for example, a nominally horizontal primary orientation), open or windowed housings, motors or actuators for reorienting position (e.g. of camera viewing direction). In some implementations, batteries may be located away from the working heads, e.g. in shielded housings on the ground at the base of a DAU. Gathered data is transmitted by RF, wired, or other wireless technology to local or central command centers where the data is received directly by one or more command and control consoles, CCC (e.g. computers and display panels running specialized software). In some cases, particularly when the monitored area is not too large, the CCC might take the form of a laptop, tablet, cell phone, or the like while in other cases, e.g. when a larger area to be monitored exists, the CCC functionality might be divided between multiple laptops, or the like, and may also use supplemental displays (e.g. LED, LCD, plasma displays, projectors, or the like). The data display may occur via text but in the most preferred embodiments the majority of data is displayed in a graphical or image-based format over a map (e.g. a topo map, a satellite image, a real-time visual image or IR image gathered by a satellite, drone, helicopter, or the like) of the region based on GPS coordinates of the individual DAUs. Information gathered and transmitted may include for example wind direction, wind speed, air temperature, humidity, barometric pressure, directional IR levels around and above the sensor array, visual images and/or IR images, GPS coordinators, compass direction, gravity direction (e.g. this may be used to detect systems that have fallen over), DAU status, and the like. In the most preferred embodiments imaging systems will provide vision capability in multiple directions (e.g. forward-backward, side-to-side, in 60-degree intervals circumferentially around the array and possibly above the array or at various angles (e.g. to provide visual or IR imaging of ember movement), and/or or they may be directable in a programmed or commanded manner. IR imaging sensors may measure relevant IR information associated with a fire using filtered wavelength bands that are non-existent in ground level solar radiation so that solar radiation doesn't blind or otherwise interfere with the detection of flying embers or relevant fire related detections. In some embodiments, actuated camera scanning may be eliminated. In some embodiments, still or video camera functionality may be completely eliminated in favor of directional IR sensing. In some embodiments imaging system orientation may be dictated by the wind direction. In some implementations, DAUs or at least the sensor array portions thereof (e.g. working heads), may be actuatable between a primary functioning mode and a protected mode (e.g. turtle mode), wherein the most sensitive sensor array elements or costly sensor array elements forming part of a DAU are withdrawn into a protective shield (which may include radiation reflective shielding as well as thermally insulative shielding and perhaps even water jacketed pockets to provide water that can boil away during high temperature exposure events so as to maintain survivable temperature within the shielded enclosures for longer periods. The transition to protective, or turtle, mode can occur automatically based on data received from the sensor array indicating that the conditions for normal operation have become unfavorable or are anticipated to become unfavorable (e.g. when temperature or IR levels become too high). Alternatively, the transition may occur upon command from a control center (e.g. to help protect the system from an upcoming water drop). In another alternative, approaching battery depletion may dictate the transition from an operational to a protected state. Similarly, the array may automatically come out of the protective mode or be commanded to do so. In some embodiments, where need for data overrides enhanced survivability associated with entering the turtle mode, a DAU may be commanded to not enter turtle mode. In some embodiments even while in protected mode, the sensor array and its control systems may continue some data gathering, communication, and even battery charging. In some implementations the sensor arrays and associated hardware can provide radio wave repeater functionality to provide improved overall radio communications (either for voice communications or data communications) during a fire. In some embodiments, the sensor arrays may not only include information gathering and transmission capability but also data processing capability to automatically change data transmission content when certain events occur. For example, such a content change may occur when a fire or flying embers become visible in some direction (either as seen by a camera or by a directional IR tracker), or when wind direction, speed, temperature, humidity is changing or trending for good or bad. Alternatively, such processing of information may be limited to command center computers based on raw data received. In some embodiments, the DAUs may be equipped with user interface features, displays, speakers, microphones, lights, beacons, or the like. In some embodiments radio communications may be line of sight based, cell tower based, satellite based, or have a different RF basis.

Some embodiments of the invention provide for improved systems for monitoring fires and include: (1) Multiple (local or remote), unmanned information acquisition stations with real-time communication capability (e.g. Real-Time Data Acquisition Stations or Units, i.e. DAUs); (2) One or more data integration, processing, display, and possibly even control stations (e.g. laptop computers running specialized programs possibly with enhanced display capabilities, aka Data Integration and Display Stations, or (DIDS); and programs, or hard coded functionality, executable by the multiple DAUs and DIDS.

In some embodiments, the DAUs may include one or more sensor, control, and communication modules (i.e. SCCMs). Some embodiments add additional mechanical & electromechanical features to the one or more communications modules. In some embodiments, multiple communication modules may provide largely redundant functionality while in other embodiments, different functionality might be provided by different modules. In some embodiments sensing functionality may be provided, at least in part, in a distributed manner. In some embodiments, some SCCMs may be provided with or be movable in and out of thermally shielded doors, walls, or housings.

In different embodiments, the DAUs may include a number of different types of sensors, components, and/or functionality. For example, such sensors, components, and functionality may include: (1) one or more GPS coordinate sensors (e.g. to provide a DAUs position information); (2) one or more compass direction sensors (e.g. to provide a DAUs orientation information or orientation information for individual DAU components such as the direction a camera or IR directional sensor is pointing); (3) one or more gravity sensors (e.g. to aid in leveling a DAU or determining if it as fallen over), (4) one or more wind speed sensors; (5) one or more wind direction sensors; (6) one or more internal & external air temperature sensors; (7) one or more surface temperature sensors (e.g. to provide an indication of IR heating level within a DAU); (8) one or more IR sensors, e.g. an array of IR sensors looking horizontally and above the horizontal plane (e.g. to provide IR tracking or directional information for detecting visible fire or flying embers) or even filtered wavelength specific IR sensors, e.g. that may be used to separate IR readings from sources of interest from IR readings that originate from non-interesting sources (e.g. flames are an interesting IR source but the sun may not be); (9) one or more humidity sensors; (10) one or more barometric pressure sensors (e.g. this may be used in combination with other data to predict upcoming changes in wind direction or speed); (11) one or more elevation sensors; (12) one or more visible image camera/video systems; (12) one or more IR image camera/video systems; (12) one or more microcontrollers and/or data processors (e.g. in some embodiments these may include user interface controls for displays, microphone, and/or speakers); (13) one or more batteries internal to an SCCM; (14) one or more batteries external to an SCCM; (15) linear or rotary encoders (e.g. for ascertaining motor or component position or as part of wind direction or wind speed detectors); (16) force or pressure sensors (e.g. for use in determining wind speed): (17) motors or actuators located within an SCCM or external to an SCCM (e.g. for controlling horizontal rotational, or vertical tilt motion of a camera or video system that is internal to an SCCM, controlling the relative movement of protective doors or shields); thermal electric coolers (e.g. to help control the environment within an SCCM or for a particular component; (18) one or more radio receivers; (19) one or more radio transmitters; (20) one or more radio signal relays or repeaters; (21) window shielding, e.g. quartz, for protecting sensitive electronics while in operational mode and/or (22) additional sensors or dual use of some of the above noted sensor for detecting ground movement around a DAU, for example, to detect movement of the ground during hillside or mudslide monitoring during rains after a wildfire.

In different embodiments, the DAUs may include a number of additional components such as, for example: (1) A single pole-like leg (see FIGS. 10A and 10B) with a mounting spike or positioning base with or without holes for locating mounting spikes or other anchoring elements (e.g. rope and sand bags); (2) A tripod-like stand or quad-leg stand for positioning an SCCM at a desired location (see FIGS. 7A and 7B); (3) a shielded rectangular base box, a three sided pyramid base box, or four sided pyramid base box in which the SCCM may be located during protective mode and from which the SCCM can extend during normal operation (see FIGS. 8A and 8B); (4) relatively short legs extending from a base box for leveling the base box relative to a non-horizontal or simply non-planar positioning location (see FIGS. 9A and 9B); (5) anchors for attaching the stand to the ground or other positioning surface (e.g. roof of a building or structure; (6) one or more batteries & protective compartments; (7) thermally shielded wiring for getting power from the battery to the SCCM; (8) one or more battery chargers, such as a solar panel, a wind turbine, or a thermal electric generator; (9) multimode external SCCM housing components, for example those necessary to convert from a protected or turtle mode to a normal or operational mode; (10) strong, and potentially thermally insulating, durable construction materials such as steels, ceramics, rubber, quartz, aramids, and the like; (11) reflective shielding such as thin metal foils (e.g. aluminum foil); (12) water pockets or jacketing in some shielding material to provide enhanced low temperature protection as the water evaporates or boils away—such shielding may include plugs (e.g. wax or the like) that inhibits low temperature evaporation but which opens to provide water evaporation or boiling away as temperature begins to rise—such shielding may be supplied in SCCM doors, housings, in the legs of a stand, or the like; and (13) a low volume water supply and pump for boosting water jacket performance.

FIG. 1 provides an example of what a fire behavior analyst might see on a CCC when a fire in the Santa Clarita valley area of California is surrounded by several dozen DAU devices. The burnt area may or may not be shown depending on how the software handles fire history information or information from other sources such as drone flyovers, data gathering from visible or infrared devices carried by helicopters or other fire retardant or water dropping aircraft. When viewing, an analyst might select between a number of different options some of which would illustrate one or more of the DAUs locations and status, wind speeds and directions, temperatures, humidity, wind speed and direction trending, temperature trending, humidity trending, DAU battery status, DAU camera images and/or orientations, DAU IR tracking information, or the like. Due to the wide array perspective of the figure, little about the fire and individual DAUs are shown. More could be seen, for example, by clicking on individual DAUs or drawing a rough boundary around the area to be viewed.

Figure 2:
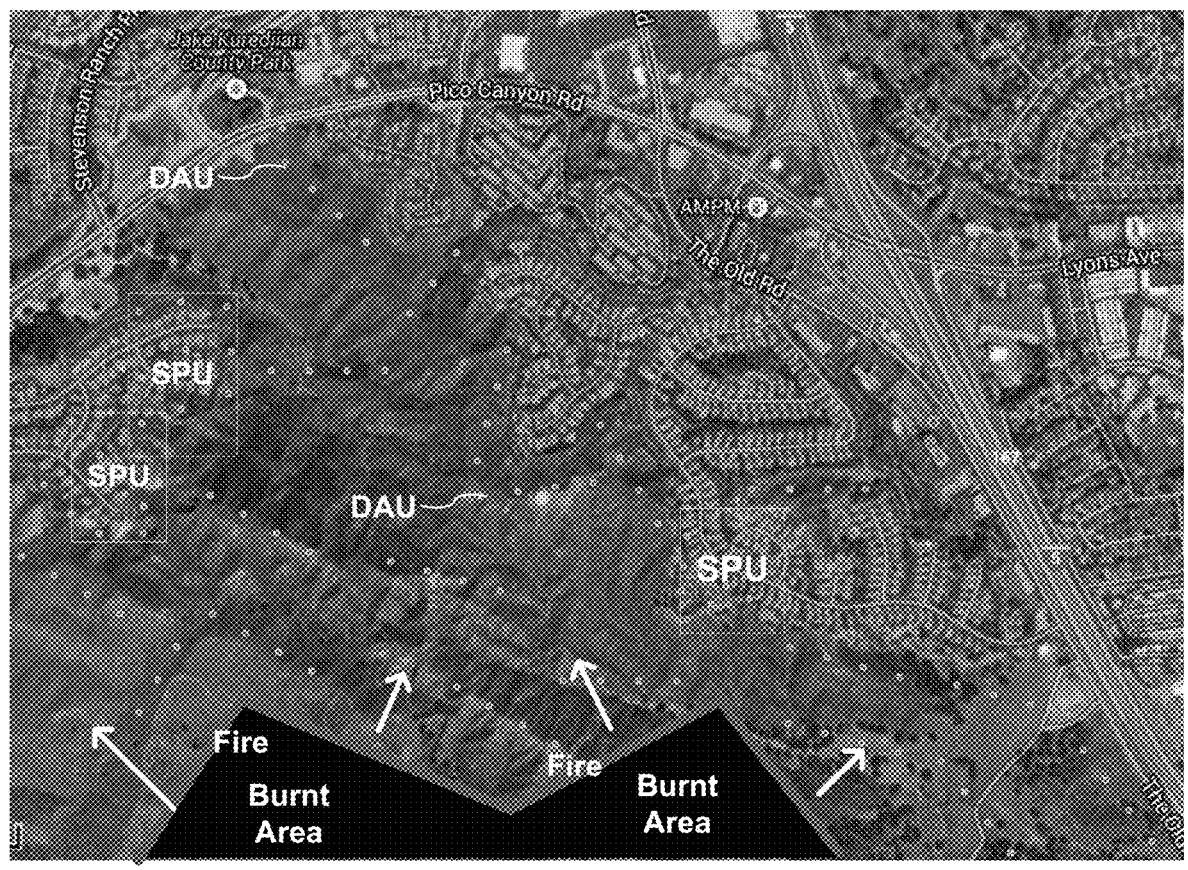
FIG. 2 provides an example of what a fire behavior analyst might see when looking at a region where DAUs are located between a fire and a number of structures.

FIG. 2 provides an example of what a fire behavior analyst might see when looking at a region where DAUs are located between a fire and a number of structures. The DAUs are being displayed in this view as simple location points. As indicated in the figure, three structural protection units (SPUs) have been defined (in an actual fire emergency, to the extent SPUs were available many more would be defined and located in proximity to the other units). Each SPU is made up of one or more fire companies (engine or engines and its or their associated firefighters) and may be assigned a group of structures to protect. The red dots in the figure represent DAUs some of which are deployed away from structures while other are deployed close to, or even on, the structures. The units that are far from the structures (remote units) are intended to provide insight regarding the fire's movement to a central command center while the close by units, or local units, are intended to provide immediate information to a specific SPU concerning fire movement and ignition around the dwellings that they are to be protect. Due to the presence of these sensor units, firefighters in an SPU can focus more of their attention on putting out ignition sites and less on monitoring possible ignition sites around other structures in their zones. This also may allow firefighters to stay closer together to improve overall safety while also improving overall effectiveness.

Figure 3:
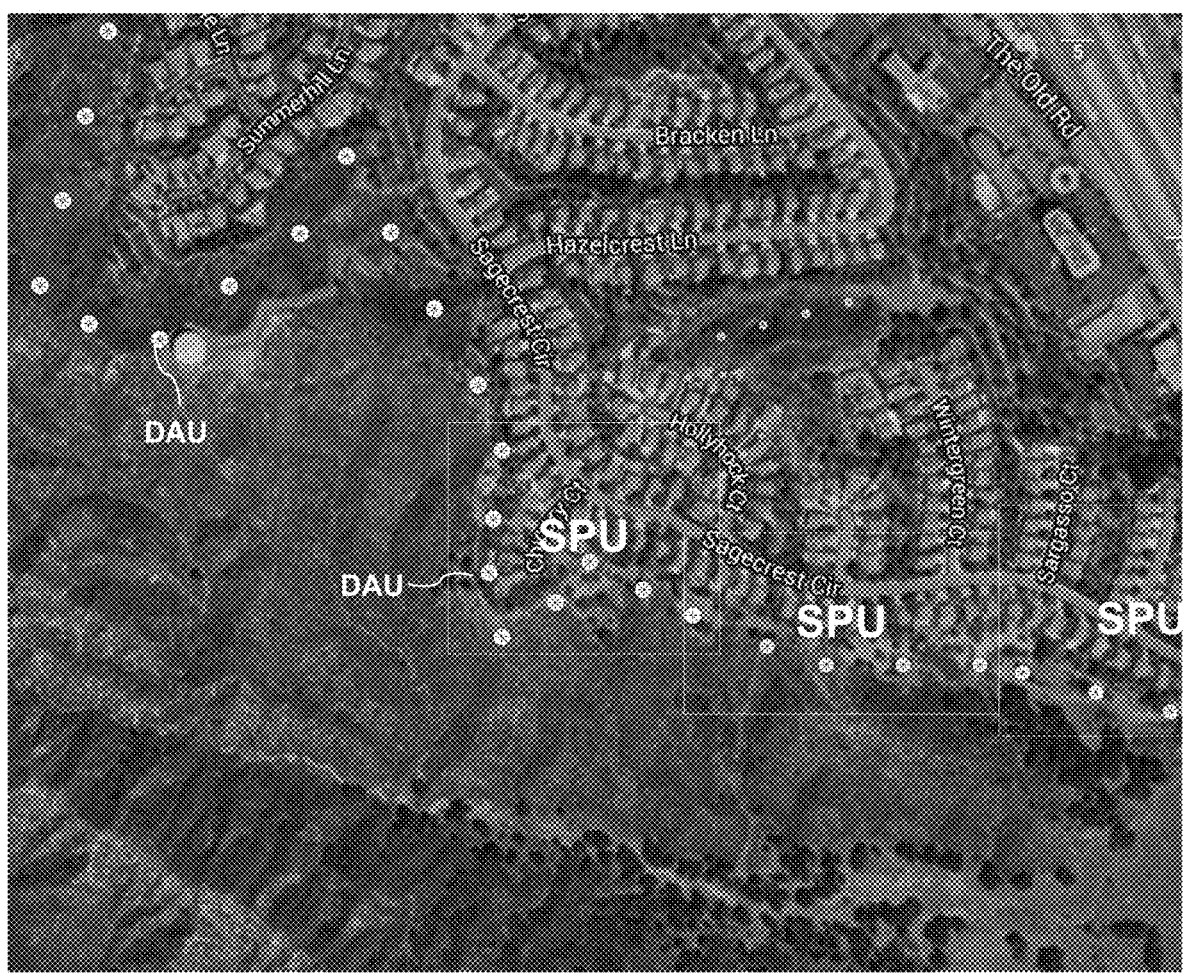
FIG. 3 focuses attention down to only the local groups of DAUs that are being used directly by several SPUs to provide enhanced structural protection.

FIG. 3 focuses attention down to only the local groups of DAUs that are being used directly by several SPUs to provide enhanced structural protection. CCCs at the command center might monitor these DAUs along with the remote units but most preferably each SPU has a CCC to monitor the DAUs most relevant to it (i.e. those near its structures) and perhaps those along an escape route (if considered an issue). As with the previous figures this figure shows the DAUs in a "display location mode" only.

Figure 4:
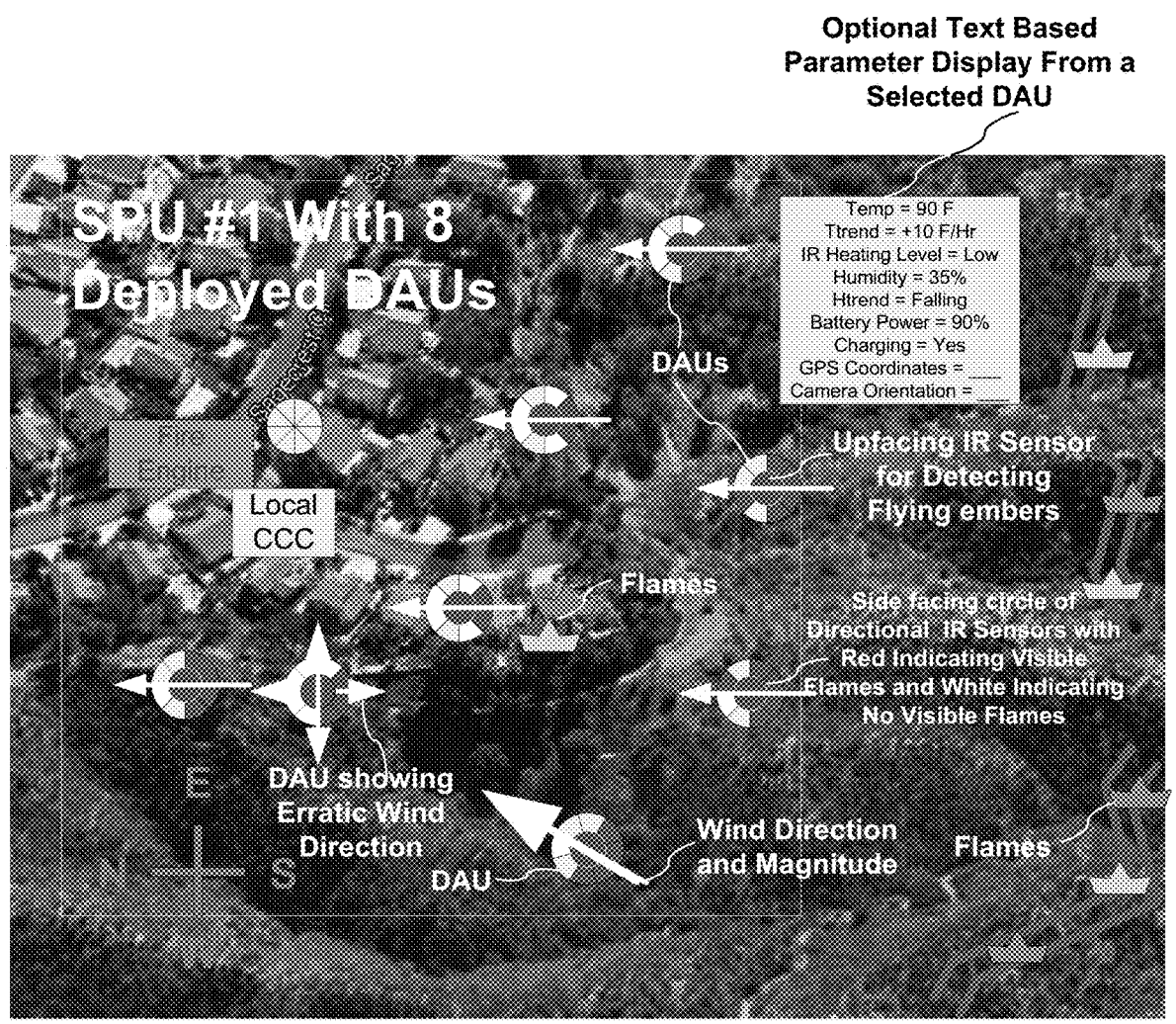
FIG. 4 depicts an even closer view of a single SPU, its structures and its DAUs along with more detailed information being provided by each DAU.

FIG. 4 depicts an even closer view of a single SPU, its structures and its DAUs along with more detailed information being provided by each DAU. In this FIG. the CCC is displaying the DAUs data in a wind and fire mode. Different symbols are used to convey different information to the firefighters. The flames shown on the right side of the drawing may not actually be seen until this information is extracted from visual or IR camera data. In this example, the direction of the arrows shows the direction the wind is blowing while the size of their respective arrow heads show the local wind strength. The circle in the center of each DAU symbol shows an IR signature overhead. If the sun is overhead, it may be necessary to have filtered IR detection so that solar blind determinations may be made to allow detection of other IR sources that are overhead (e.g. flying embers). Instead of using IR trackers for this purpose, a visible camera or IR camera with image recognition software may be used. Image processing may be done at the DAUs or by the CCC. The eight sections surrounding the central region for each DAU provide an indication as to the directions in which IR signatures are present (e.g. from flames). The DAUs having multiple arrows show erratic wind conditions. In some embodiments, for example, flashing DAU images may indicate that changes have occurred for which attention is required such as, for example, IR signals are coming from a new direction, IR signals have increased significantly, local air temperature has increased, a need to enter a protected state is approaching or the DAU has already entered such a state, or the like. As indicated at the top of the figure, additional data from a given DAU can be presented in text format. As noted previously alternative screen configurations can be shown that present different types of data for all DAUs or for some DAUs. In some alternatives different icons may be used to depict different fire relevant parameters either individually or simultaneously. In some alternative embodiments, additional non-vertical and non-horizontal IR directional sensors may be used to provide additional pieces of information.

Figure 5:
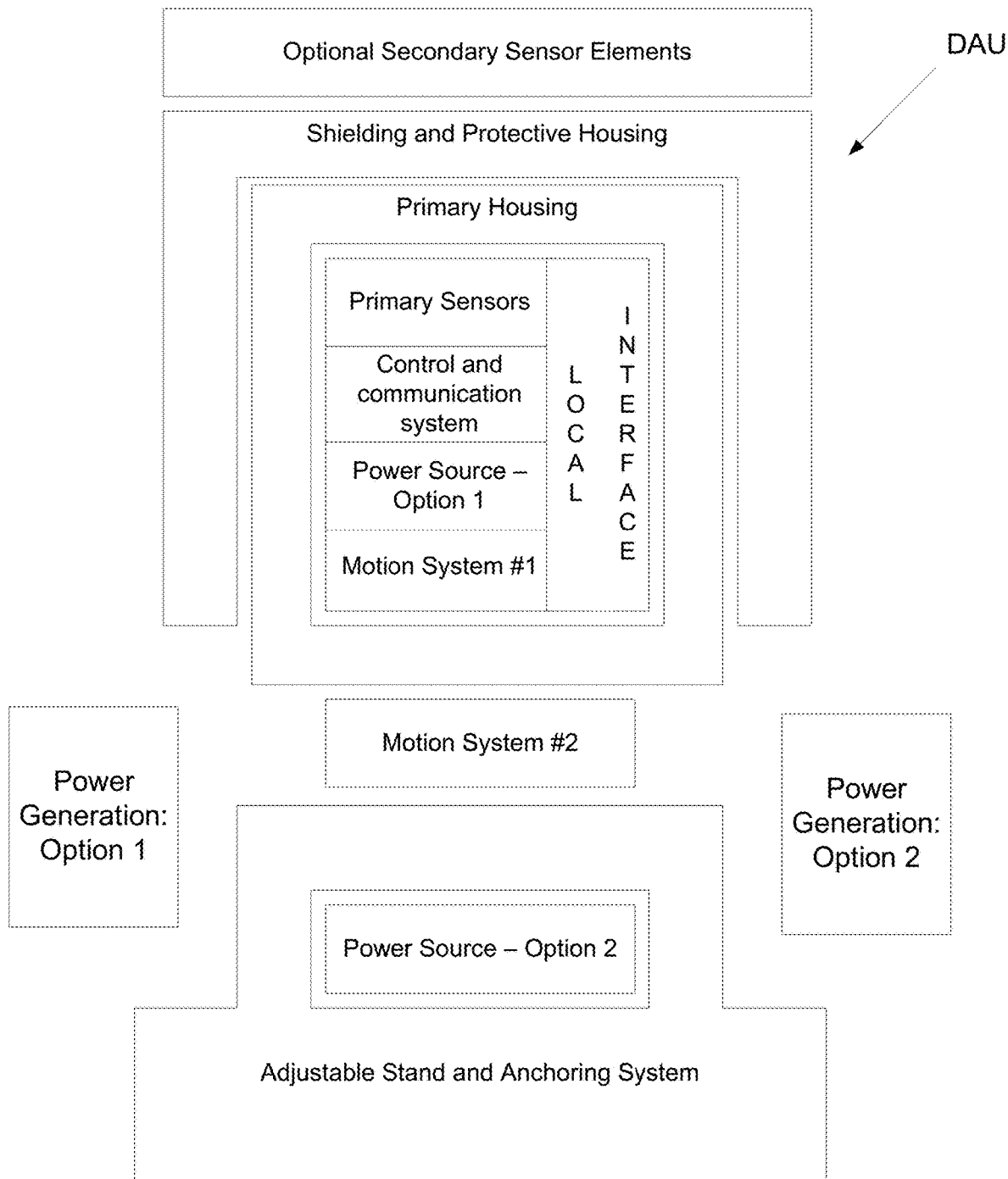
FIG. 5 provides a schematic illustration some elements that may be included in a DAU.

FIG. 5 provides a schematic illustration some elements that may be included in a DAU.

Figure 6A:
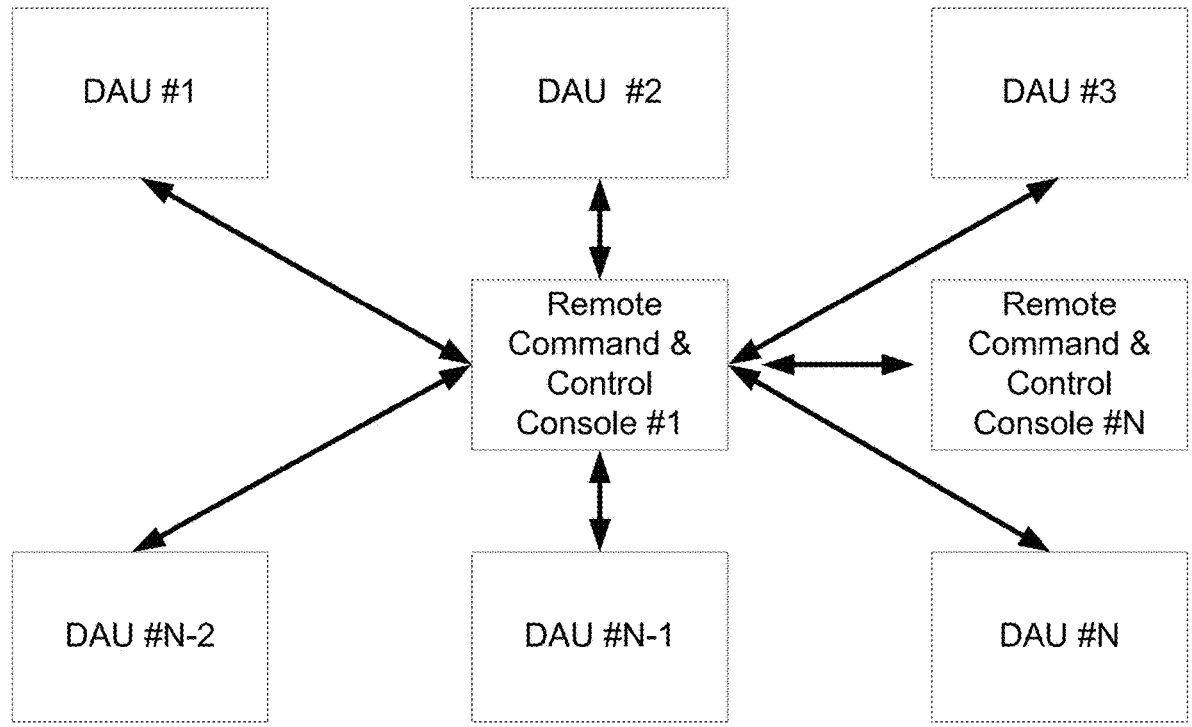
FIGS. 6A and 6B depict two versions of the relationship between DAUs and command and control consoles.
Figure 6B:
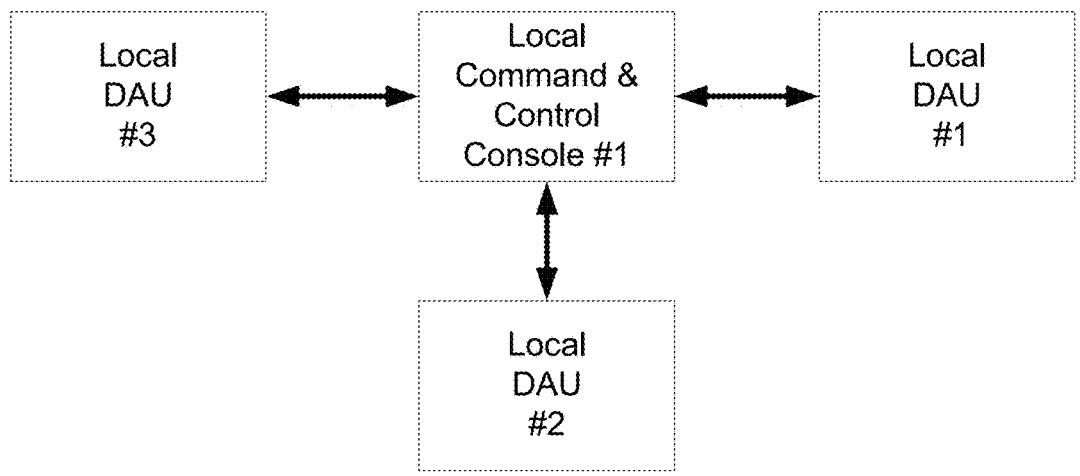

FIGS. 6A and 6B depict two versions of the relationship between DAUs and command and control consoles.

FIGS. 7A and 7B depict collapsed and expanded versions of a DAU that uses a tripod stand and includes the ability to rotate the working head about a vertical axis and rotate the working head to different angles above the horizontal plane, the device depicts a flag-like wind direction sensor and a triple cup wind speed sensor as well as domed sensor including a plurality of IR trackers. The device also includes a camera system and various other electronic modules. The legs include pads or feet that allow the insertion of spikes or other anchoring elements. Alternative devices may use different numbers of legs (e.g. four legs), different numbers of leg extension sections such as 2, 4 or 5 sections.

Figure 8A:
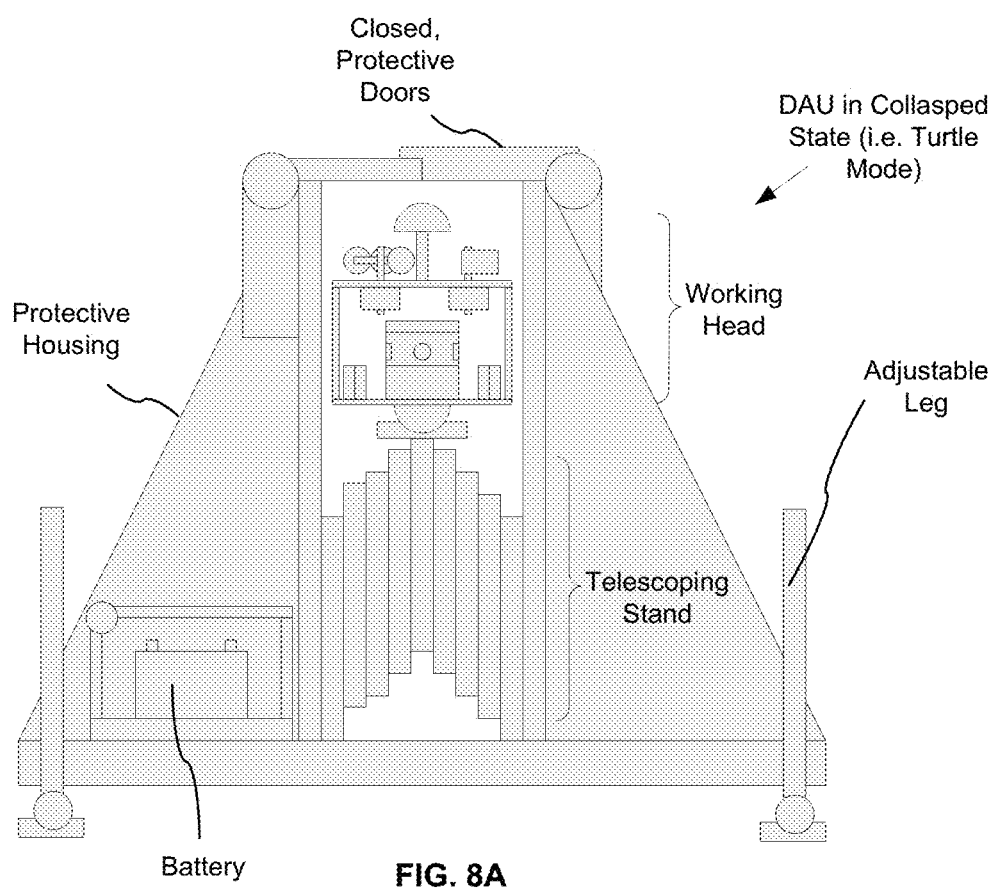
FIGS. 8A and 8B depict closed and open versions, respectively, of a DAU that includes a pyramidal box-like protective housing from which the sensor array can be extended from or drawn into.
Figure 8B:
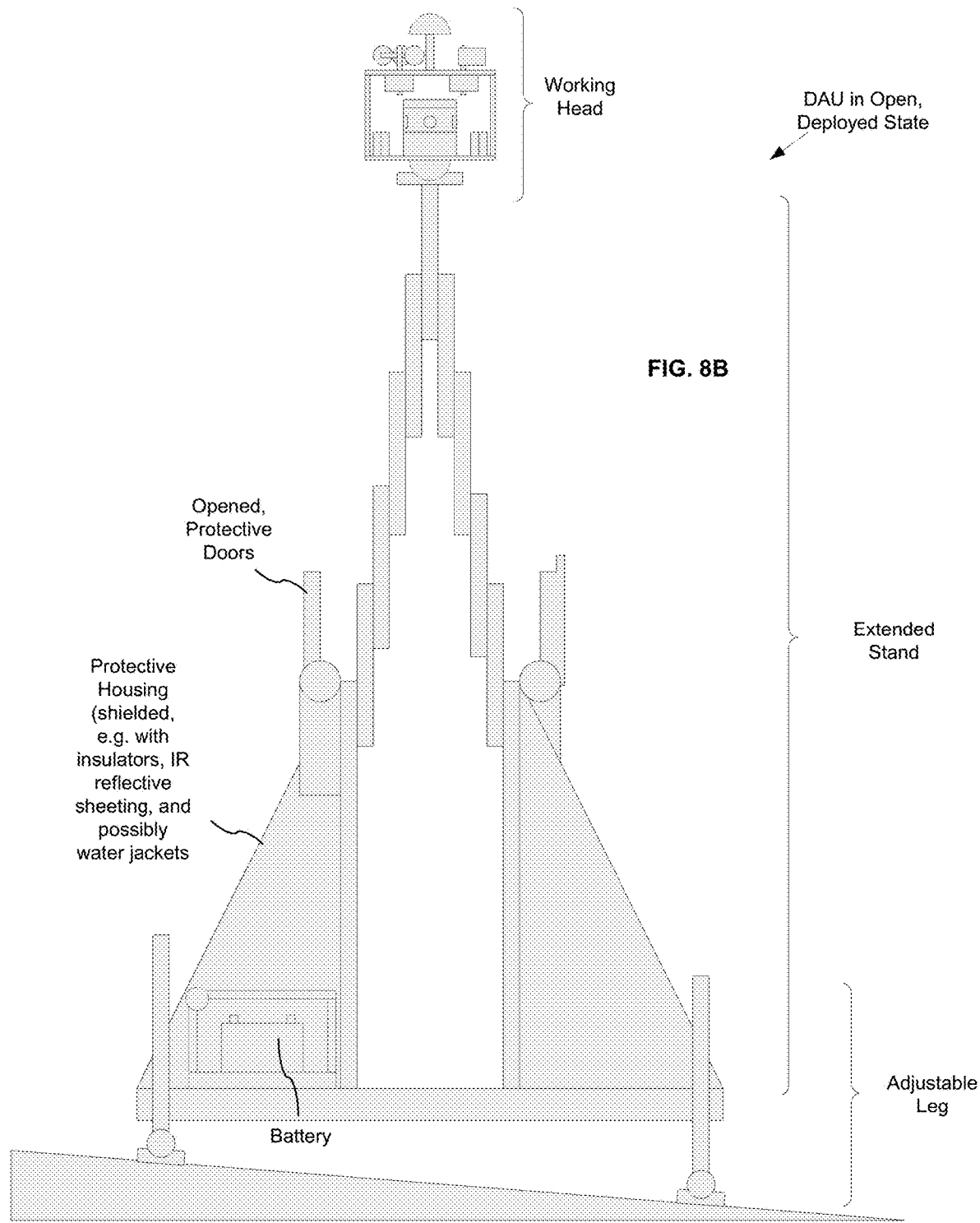

FIGS. 8A and 8B depict open and closed versions of a DAU that includes a pyramidal box-like protective housing from which the sensor array can be extended from or drawn into. The front protective shields have been removed so that the extendible arms, working head, battery, and collapsible cap can be seen. The unit also includes extendable legs for leveling the device on uneven terrain. In alternative embodiments, the protective housing may take on a rectangular-box shape, a cylindrical shape, a box with sloped sides and a vertical front and back, and the like.

Figures 9A, 9B:
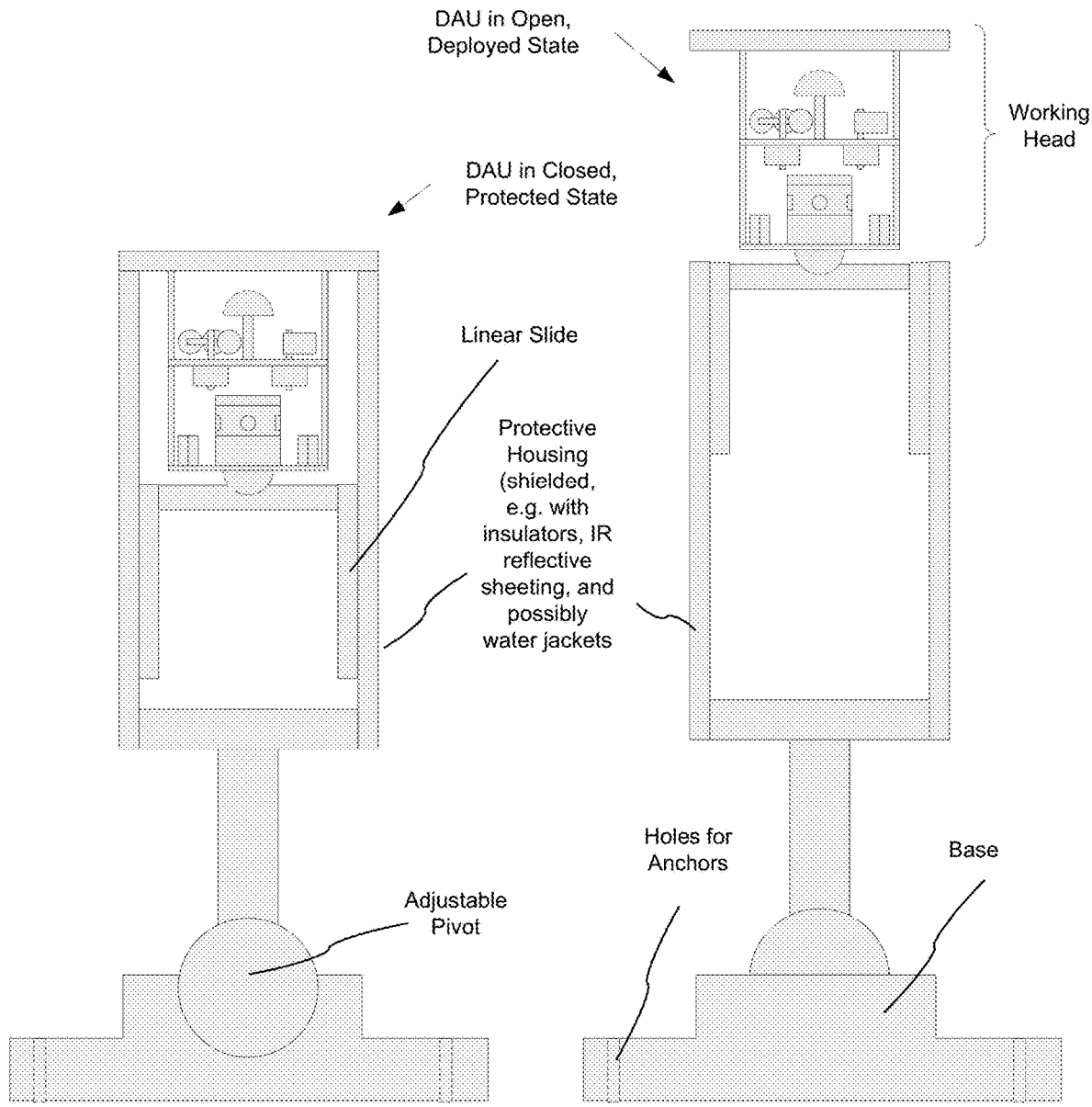
FIGS. 9A and 9B depict another alternative DAU configuration wherein the stand includes a single pole-like leg, a base and a pivotable joint between the two.

FIGS. 9A and 9B depict another alternative DAU configuration wherein the stand includes a single pole-like leg, a base and a pivotable joint between the two. In some variations, the base may not only include holes for holding spikes or other anchoring elements but standoffs for providing a more stable contact with uneven terrain. In this embodiment, the working head is topped by a shielded cap and can move up and down, out of and into a protective housing that may for example be provided by a box, cylinder, hexagonal, or other extended hollow structure.

Figures 10A, 10B:
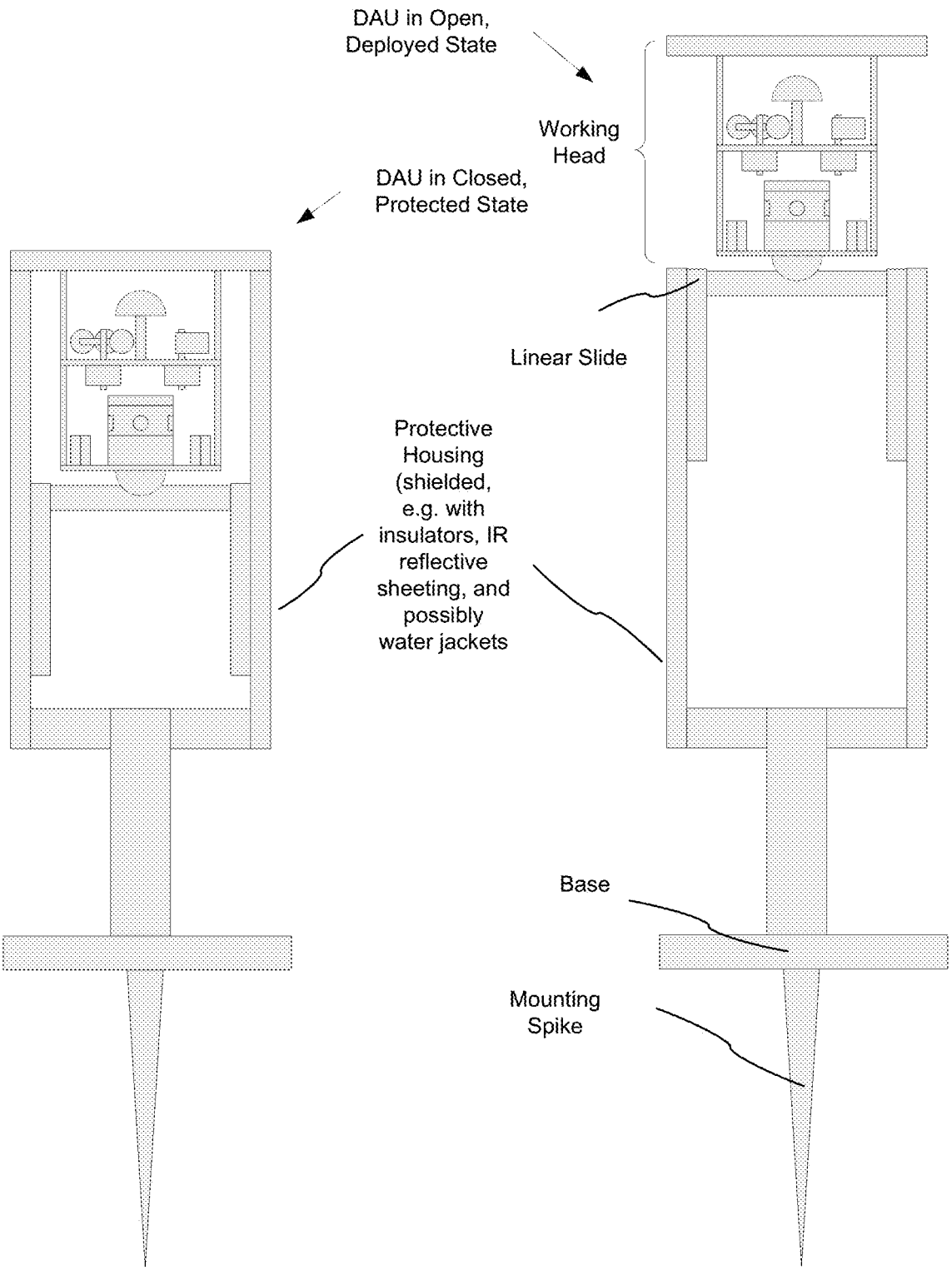
FIGS. 10A and 10B provide another example DAU lowered into the protective housing and raised out of the housing where the DAU is provided with a pole like stand and a spike and base which may be used to stick the pole into the ground.

FIGS. 10A and 10B provide another example DAU lowered into the protective housing (FIG. 10A) and raised out of the housing (FIG. 10B). In this embodiment the pole like stand is provided with a spike and base which may be used to anchor the pole to the ground.

Control and command consoles (CCCs) or processing and display stations (PADS) useable with the various DAUs set forth herein may take on a variety of forms from laptop computers, workstations, tablets, and even smart phones, or the like. Such CCCs may further include supplemental monitors or projectors.

In use, data obtained from each DAU is periodically transmitted to the CCC, CCCs, PAD, and/or PADs so data may be displayed on a location basis, e.g. over a map of the region of interest, in substantially real time. Various functionalities are possible and include for example (1) changing the display format or display content as a whole or on a DAU-by-DAU basis; (2) opening and closing visible or IR video displays or still shot displays from individual DAUs, (3) turning selected DAU cameras to desired directions to gain additional insight about a location, (4) communicating with DAUs as a whole or on an individual basis, e.g. to change update rates, type of information being sent with each update, camera type being used, camera direction, position recalibration, other DAU embedded functionality, and the like. In some embodiments, the CCC or PADS may directly transmit area relevant information to firefighters in those areas. Real time monitoring systems as set forth herein may be used with personal electronic monitoring devices carried by individual firefighters.

It will be apparent to those of skill in the art that numerous variations of the embodiments of the invention are possible upon review of the teachings herein. Some such variations may involve completely removing the pole or leg portion of the DAUs in favor of other mounting hardware that may be used to attach the DAUs to some existing buildings, trees, fence posts and the like that may be located in an area of interest. In some embodiments, a working head may be located on a controllable base which in turn sits on a battery or other relatively heavy mounting structure.

In view of the teachings herein, many further embodiments, alternative methods and systems will be apparent to those of skill in the art. As such, it is not intended that the invention be limited to the particular illustrative embodiments, alternatives, and uses described above but instead that it be solely limited by the claims presented hereafter.

I claim:

1. An unmanned, real-time wildfire data acquisition unit (DAU), comprising:
   (a) a working head comprising a housing and a plurality of transducers;
   (b) control and communications electronics functionally connected to the transducers;
   (c) a power source connected to the control and communication electronics;
   wherein the plurality of transducers comprises at least one transducer selected from a first group consisting of: (I) at least one visible imaging to electrical signal transducer, (II) at least one IR imaging to electrical signal transducer, (III) a plurality of differently oriented non-imaging IR to electrical signal transducers; and
   wherein the plurality of transducers comprises at least two transducers selected from a second group consisting of:
   (1) at least one wind speed to electrical signal transducer, (2) at least one wind direction to electrical signal transducer, (3) at least one humidity to electrical signal transducer, (4) at least one air temperature to electrical signal transducer, (5) at least one surface temperature to electrical signal transducer, (6) at least one GPS location to electrical signal transducer, (7) at least one GPS orientation to electrical signal transducer, (8) at least one barometric pressure to electrical signal transducer, (9) at least one radio wave to electrical signal transducer, (10) at least one user input to electrical transducer, (11) at least one electrical signal to user understandable output transducer, and (12) a power source power level transducer; and wherein the control and communication electronics comprise circuitry to provide sending of radio signals for carrying data derived from the at least one transducers of the first group and the at least two transducers of the second group, and for at least one function selected from a third group consisting of: (i) receiving radio signals and modifying a behavior of the DAU according to received signals, (ii) analyzing data obtained from at least one transducer to yield trend information from that transducer, (iii) analyzing data obtained from at least one transducer and modifying a radio signal transmit power, (iv) analyzing data obtained from at least one transducer and modifying a radio signal transmit frequency, (v) analyzing data obtained from at least one transducer and modifying the time frequency of radio signals being sent out, (vi) providing radio repeater functionality for voice communications, (vii) analyzing data obtained from at least one transducer to change the content of data that is being transmitted, and (viii) analyzing data obtained from at least one transducer to modify an operational mode of the DAU and report the modification.

2. The DAU of claim 1 additionally comprising:
(d) at least one actuator that is configured to implement a function selected from the group consisting of: (1) modifying an observation direction of the working head, (2) changing a height of the working head, (3) changing a vertical orientation of the working head, (4) relatively moving a thermal shield and the working head so that the thermal shield covers at least a portion of the working head; and (5) relatively moving a thermal shield and the working head such that the working head extends from a position of thermal shielding where a selected parameter detection is not possible to a working position where detection of the selected parameter is possible; and
(e) electronic circuitry controlling the at least one actuator to provide the selected function of (d) in response to a control signal arising from the group consisting of: (1) a single transducer reading, (2) a plurality of transducer readings, (3) analysis of a plurality of transducer signals received by the electronic circuitry forming part of the DAU; and (4) a received radio signal.

3. The DAU of claim 1 additionally comprising an enclosure that is provided with thermally productive shielding selected from the group consisting of: (1) thermally insulative shielding, (2) radiation reflective shielding, (3) at least one water jacket that allows evaporation of, or boiling away, of contained water during a high temperature fire exposure event so as to maintain the temperature within the enclosure at a survivable level for sensitive electronics.

4. The DAU of claim 3 comprising the at least one water jacket and additionally comprising a pump for supplying water from a separate supply to the at least one water jacket.

5. The DAU of claim 1 wherein the control electronics comprise executable software capable of running in a microprocessor that forms part of the electronic circuitry of the DAU and wherein the power source comprises at least one battery, and wherein the DAU comprises at least two functions from the third group.

6. The DAU of claim 5 wherein the at least one battery comprises at least two batteries with one located within the working head and the other external to the working head and located in a thermally shielded housing on the ground.

7. The DAU of claim 1 additionally comprising electronic circuitry located in a region of the DAU separated from the working head which communicates with the electronic circuitry in the working head via a method selected from the group consisting of: (1) wires and (2) wireless technology, and wherein the at least one function from the third group comprises at least three functions.

8. The DAU of claim 3 comprising the at least one water jacket and additionally comprising a plug for the water jacket that prevents evaporation of water from the jacket when closed but can open to allow water evaporation or boiling.

9. The DAU of claim 1 wherein the at least one transducer of the first group comprises at least two transducers and the at least two transducers of the second group comprise at least four transducers, and wherein the at least one function of the third group comprises at least two functions.

10. The DAU of claim 1 being portable and additionally comprising a stand comprising a feature selected from the group consisting of: (1) at least one leg which is used to locate the working head off the ground with a desired orientation and height, (2) at least three legs which are used to locate the working head off the ground, (3) at least one element configured for anchoring the DAU to the ground, and (4) a base on the ground from which the working head can extend at least five feet.

11. The DAU of claim 1, comprising mounting hardware for attaching the DAU to an existing structure.

12. The DAU of claim 11 wherein the existing structure is selected from the group consisting of: (1) a building, (2) a fence post, and (3) a tree.

13. The DAU of claim 1 comprising an infrared transducer wherein the infrared transducer uses filtered wavelength bands so that ground level solar radiation does no blind or otherwise interfere with the detection of flying embers.

14. A system for monitoring wildfires, comprising:
a. at least one real-time wildfire data acquisition unit (DAU), comprising:
 1. a working head comprising a housing and a plurality of transducers;
 2. control and communications electronics functionally connected to the transducers;
 3. a power source functionally connected to the control and communication electronics;
 wherein the plurality of transducers comprises at least one transducer selected from a first group consisting of: (I) at least one visible imaging to electrical signal transducer, (II) at least one IR imaging to electrical signal transducer, (III) a plurality of differently oriented non-imaging IR to electrical signal transducers; and
 wherein the plurality of transducers comprises at least two transducers selected from a second group consisting of: (1) at least one wind speed to electrical signal transducer, (2) at least one wind direction to electrical signal transducer, (3) at least one humidity to electrical signal transducer, (4) at least one air temperature to electrical signal transducer, (5) at least one surface temperature to electrical signal transducer, (6) at least one GPS location to electrical signal transducer, (7) at least one GPS orientation to electrical signal transducer, (8) at least one barometric pressure to electrical signal transducer, (9) at least one radio wave to electrical signal transducer, (10) at least one user input to electrical transducer, (11) at least one electrical signal to user understandable output transducer; and (12) a power source power level transducer; and wherein the control and communication electronics comprise circuitry to provide sending of radio signals for carrying data derived from the at least one transducer of the first group and the at least two transducers of the second group, and for at least one function selected from a third group consisting of: (i) receiving radio signals and modifying a behavior of the DAU according to received signals; (ii) analyzing data obtained from at least one transducer to yield trend information from that transducer, (iii) analyzing data obtained from at least one transducer and modifying a radio signal transmit power, (iv) analyzing data obtained from at least one transducer and modifying a radio signal transmit frequency (v) analyzing data obtained from at least one transducer and modifying the time frequency of radio signals being sent out, (vi) providing radio repeater functionality for voice communications, (vii) analyzing data obtained from at least one transducer to change the content of data that is being transmitted, and (viii) analyzing data obtained from at least one transducer to modify an operational mode of the DAU and report the modification; and b. at least one command and control console (CCC) which provides a primary interface with a system user;

wherein information gathered by the at least one DAU is displayed on the CCC to provide a user with useful real time information.

15. The system of claim 14 wherein the at least one DAU comprises a plurality of DAUs.

16. The system of claim 15 wherein the at least one CCC comprises at least two CCCs which each display information selected from the group consisting of: (1) information for different DAUs and (2) information for two sets of DAUs where there are at least some DAUs in one group that are not in the other group.

17. The system of claim 15 wherein the at least one CCC is configured to display information, at least partially, in a graphical format overlaid on a map showing the relative positions of the plurality of DAUs and wherein the CCC comprises a program that is capable of simultaneously displaying different types of information for at least two of the plurality of DAUs.

18. The system of claim 17 wherein the CCC comprises a program capable of limiting information that is being displayed to particular DAUs selected from a group consisting of: (1) DAUs associated with a single SPU, (2) DAUs associated with a plurality of proximal SPUs, (3) DAUs associated with one or more particular locations for monitoring fire-related activity, and (4) DAUs associated with an entire fire.

19. A system for monitoring wildfires, comprising:
a. at least one real-time wildfire data acquisition unit (DAU), comprising:
 1. a working head comprising a housing and a plurality of transducers;
 2. control and communications electronics functionally connected to the transducers;
 3. a power source connected to the control and communication electronics;
 wherein the plurality of transducers comprises at least one transducer selected from a first group consisting of: (I) at least on visible imaging to electrical signal transducer, (II) at least one IR imaging to electrical signal transducer, (III) a plurality of differently oriented non-imaging IR to electrical signal transducers, and
 wherein the plurality of transducers comprises at least two transducers selected from a second group consisting of: (1) at least one wind speed to electrical signal transducer, (2) at least one wind direction to electrical signal transducer, (3) at least one humidity to electrical signal transducer, (4) at least one air temperature to electrical signal transducer, (5) at least one surface temperature to electrical signal transducer, (6) at least one GPS location to electrical signal transducer, (7) at least one GPS orientation to electrical signal transducer, (8) at least one barometric pressure to electrical signal transducer, (9), at least one radio wave to electrical signal transducer, (10) at least one user input to electrical transducer, (11) at least one electrical signal to user understandable output transducer, and (12) a power source power level transducer; and
 wherein the control and communication electronics comprise circuitry to provide sending of radio signals for carrying data derived from the at least one transducer of the first group and the at least two transducers of the second group, and for at least one function selected from a third group consisting of: (i) receiving radio signals and modifying a behavior of the DAU according to received signals, (ii) analyzing data obtained from at least one transducer to yield trend information from that transducer, (iii) analyzing data obtained from at least one transducer and modifying a radio signal transmit power, (iv) analyzing data obtained from at least one transducer and modifying a radio signal transmit frequency, (v) analyzing data obtained from at least one transducer and modifying the time frequency of radio signals being sent out, (vi) providing radio repeater functionality for voice communications, (vii) analyzing data obtained from at least one transducer to change the content of data that is being transmitted, and (viii) analyzing data obtained from at least one transducer to modify an operational mode of the DAU and report the modification; and
b. at least one personal monitoring device configured to provide data gathered by the at least one DAU to provide a system user with real-time information that is gathered by the DAU.

20. The system of claim 19 wherein the at least one DAU comprises a plurality of DAUs and the at least one personal monitoring device comprises a plurality of personal monitoring devices with each configured to be used by an individual system user.

* * * * *